United States Patent
Jang

(10) Patent No.: US 10,703,438 B2
(45) Date of Patent: Jul. 7, 2020

(54) BICYCLE CRANK TRANSMISSION APPARATUS

(71) Applicant: CONTAVELO CO., LTD., Ulsan (KR)

(72) Inventor: Sa Seok Jang, Ulsan (KR)

(73) Assignee: CONTAVELO CO., LTD., Ulsan (KR)

( * ) Notice: Subject to any disclaimer, the term of this patent is extended or adjusted under 35 U.S.C. 154(b) by 3 days.

(21) Appl. No.: 16/072,258

(22) PCT Filed: Dec. 26, 2016

(86) PCT No.: PCT/KR2016/015275
§ 371 (c)(1),
(2) Date: Jul. 24, 2018

(87) PCT Pub. No.: WO2017/135572
PCT Pub. Date: Aug. 10, 2017

(65) Prior Publication Data
US 2019/0031285 A1 Jan. 31, 2019

(30) Foreign Application Priority Data
Feb. 5, 2016 (KR) ........................ 10-2016-0014885

(51) Int. Cl.
*B62M 9/08* (2006.01)
*F16H 21/18* (2006.01)
(Continued)

(52) U.S. Cl.
CPC ................ *B62M 9/08* (2013.01); *B62M 9/06* (2013.01); *B62M 11/14* (2013.01);
(Continued)

(58) Field of Classification Search
CPC .......... B62M 9/06; B62M 9/08; B62M 9/085; B62M 11/14; B62M 11/145; B62M 1/36;
(Continued)

(56) References Cited

U.S. PATENT DOCUMENTS

| | | | | |
|---|---|---|---|---|
| 2,600,586 | A * | 6/1952 | Spencer | B62M 9/085 |
| | | | | 475/172 |
| 4,712,450 | A * | 12/1987 | Takamiya | B62M 25/00 |
| | | | | 475/170 |
| 5,685,794 | A * | 11/1997 | Willmot | B62M 9/08 |
| | | | | 475/170 |

FOREIGN PATENT DOCUMENTS

| | | |
|---|---|---|
| JP | 61115791 U * | 7/1986 |
| JP | H06-239285 A | 8/1994 |

(Continued)

OTHER PUBLICATIONS

International Search Report for PCT/KR2016/015275 dated Mar. 27, 2017 from Korean Intellectual Property Office.

*Primary Examiner* — Jacob S. Scott
*Assistant Examiner* — Lori Wu
(74) *Attorney, Agent, or Firm* — Paratus Law Group, PLLC

(57) ABSTRACT

A bicycle crank transmission apparatus includes: a hollow shaft member; a base plate coupled to the shaft member on one side and installed securely on a bottom bracket featuring a spindle on the other side; a chainring housing coupled to the shaft member in a way that allows its rotation and having a ring gear installed securely inside; a reduction gear unit arranged in the middle of the ring gear; a directly-coupled ratchet unit installed on the ring gear; a crank cover where a coupling shaft coupled to the spindle is perpendicularly provided in the center and where clutch ratchet teeth, which are engaged with the directly-coupled ratchet unit, and directly-coupled ratchet teeth are vertically stacked on the internal wall surface; and a sun gear installed on the coupling shaft in such a way that it only rotates in clockwise direction and partially engaged with the reduction gear unit.

5 Claims, 10 Drawing Sheets

(51) Int. Cl.
     *B62M 9/06*     (2006.01)
     *F16H 55/30*     (2006.01)
     *F16H 1/32*     (2006.01)
     *F16D 41/06*     (2006.01)
     *F16D 41/063*     (2006.01)
     *B62M 11/14*     (2006.01)
     *F16D 41/30*     (2006.01)
     *B62M 1/36*     (2013.01)

(52) U.S. Cl.
     CPC ........... *B62M 11/145* (2013.01); *F16D 41/06* (2013.01); *F16D 41/063* (2013.01); *F16D 41/30* (2013.01); *F16H 1/32* (2013.01); *F16H 21/18* (2013.01); *F16H 55/30* (2013.01); *B62M 1/36* (2013.01); *F16H 2001/323* (2013.01)

(58) Field of Classification Search
     CPC ........ F16D 41/06; F16D 41/063; F16D 41/24; F16D 41/30; F16H 55/30; F16H 2001/323; F16H 21/18; F16H 1/32
     See application file for complete search history.

(56) References Cited

FOREIGN PATENT DOCUMENTS

| | | |
|---|---|---|
| JP | 2002-079984 A | 3/2002 |
| JP | 4398737 B2 | 1/2010 |
| KR | 10-1998-0063061 A | 10/1998 |
| KR | 10-1195422 B1 | 10/2012 |

\* cited by examiner

[FIG 2]
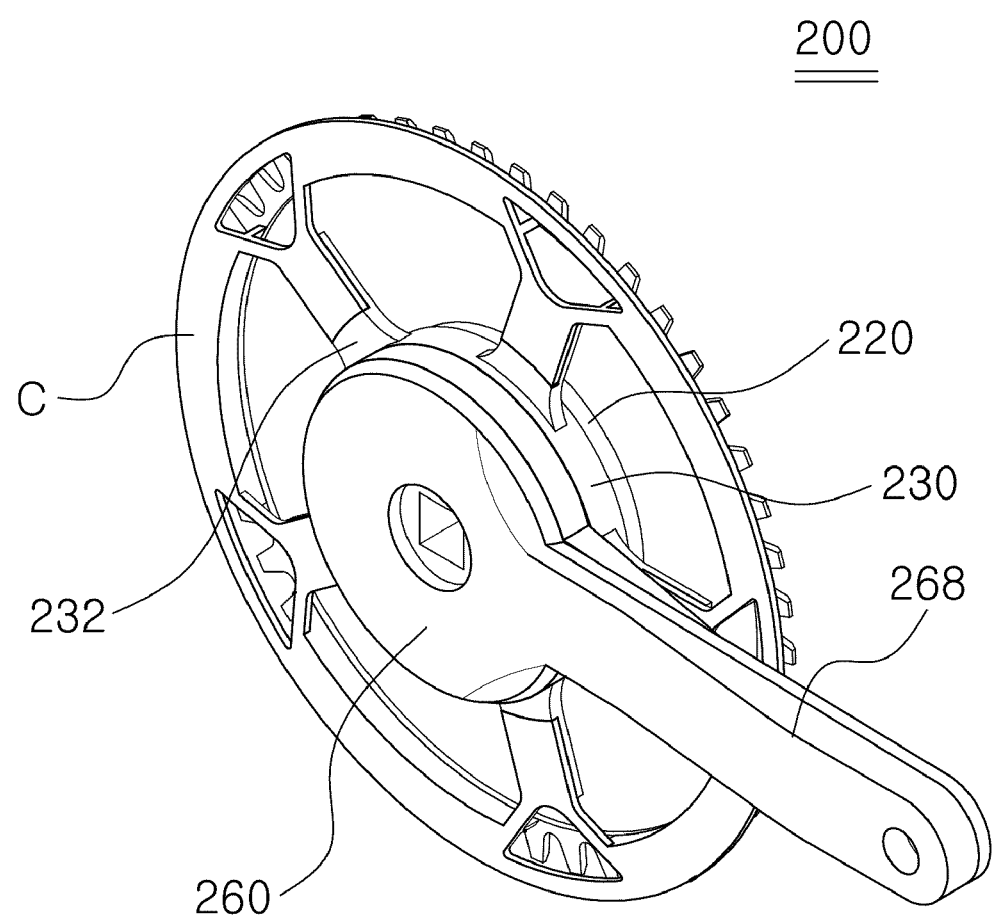

【FIG 3a】
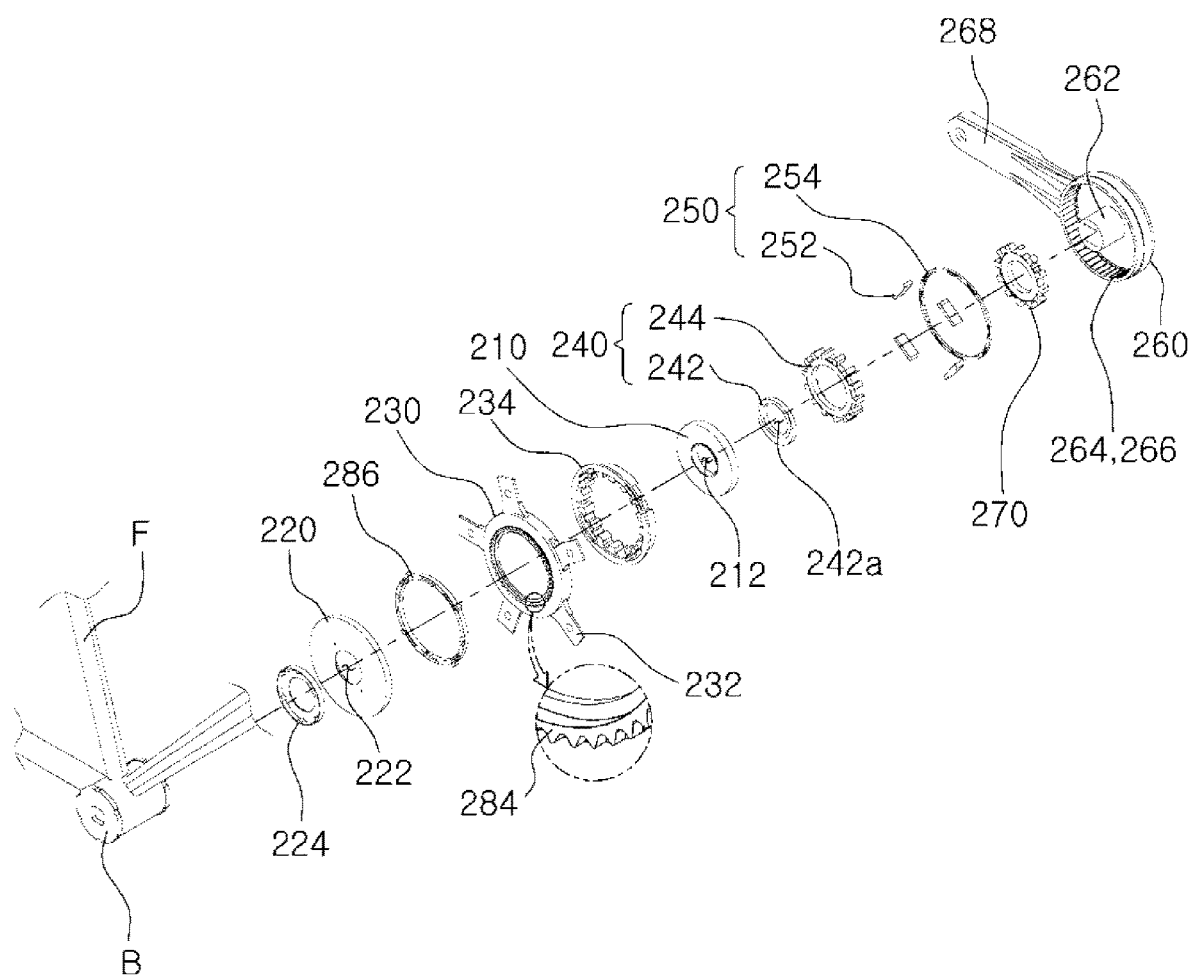

[FIG 3b]
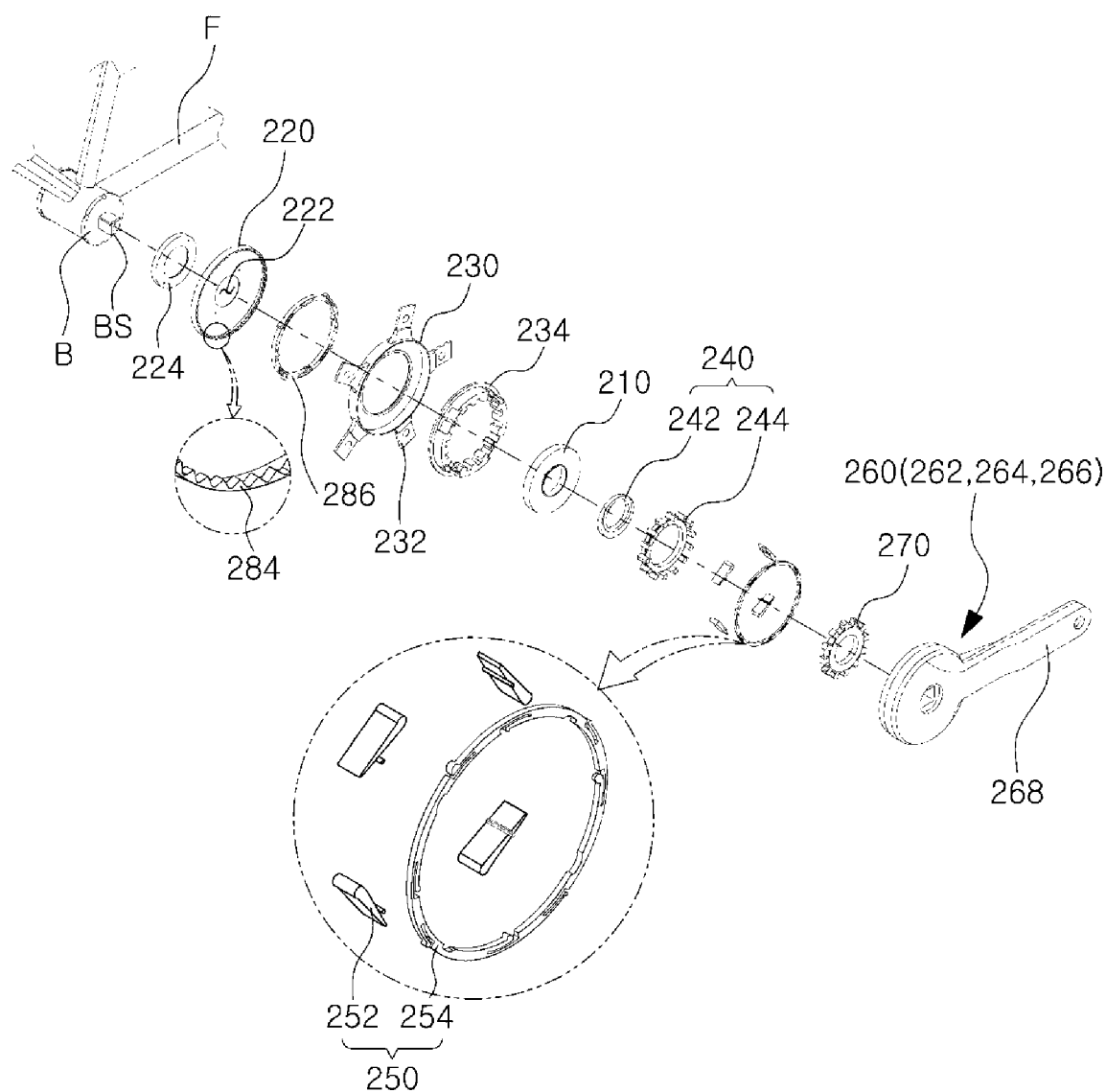

【FIG 4】
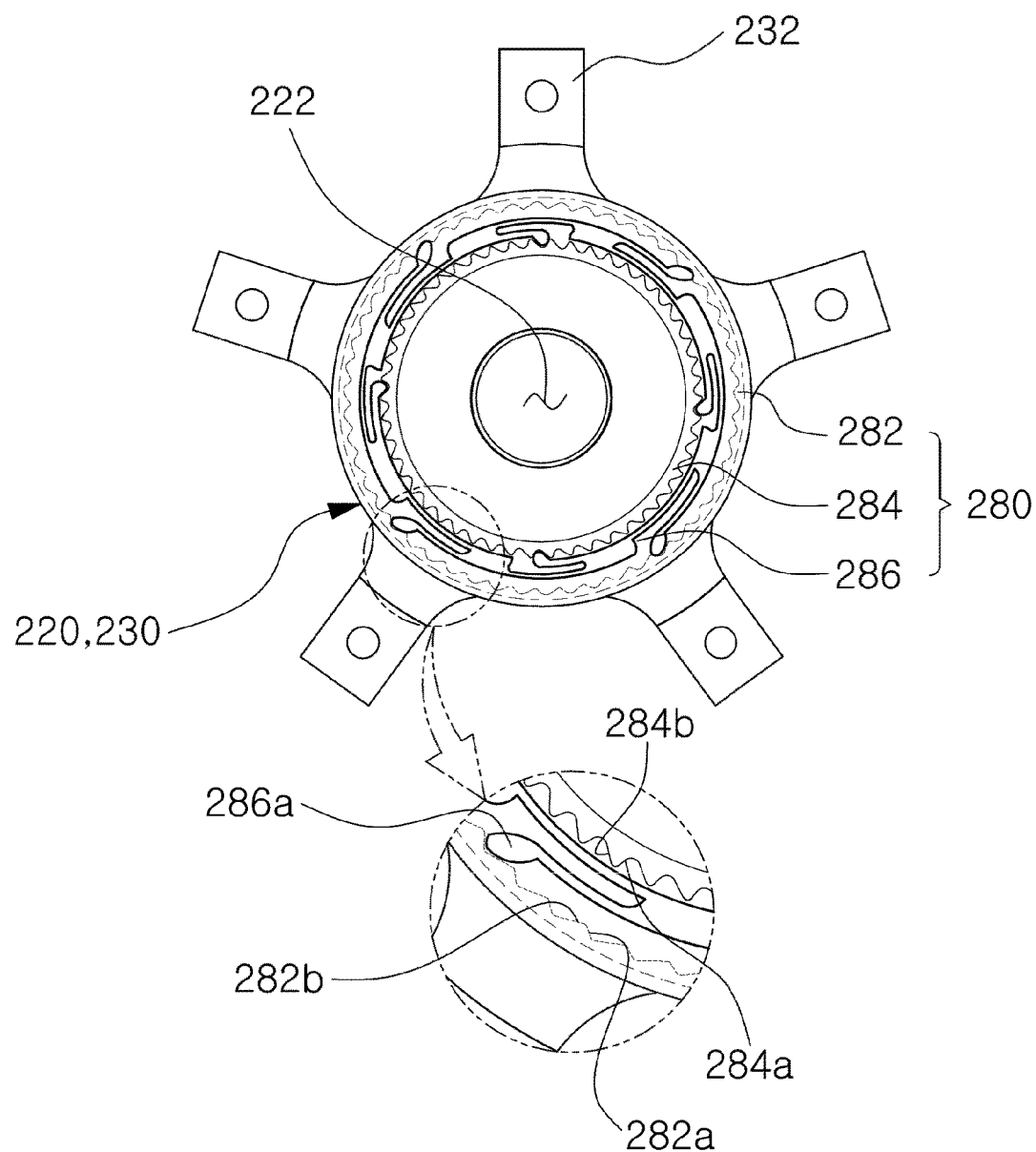

[FIG 5]
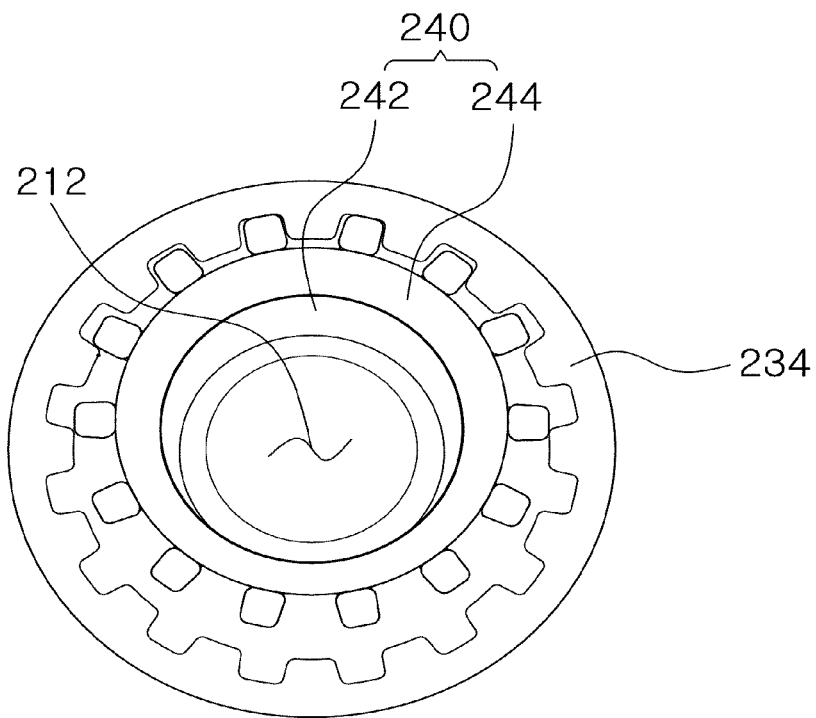
(a)
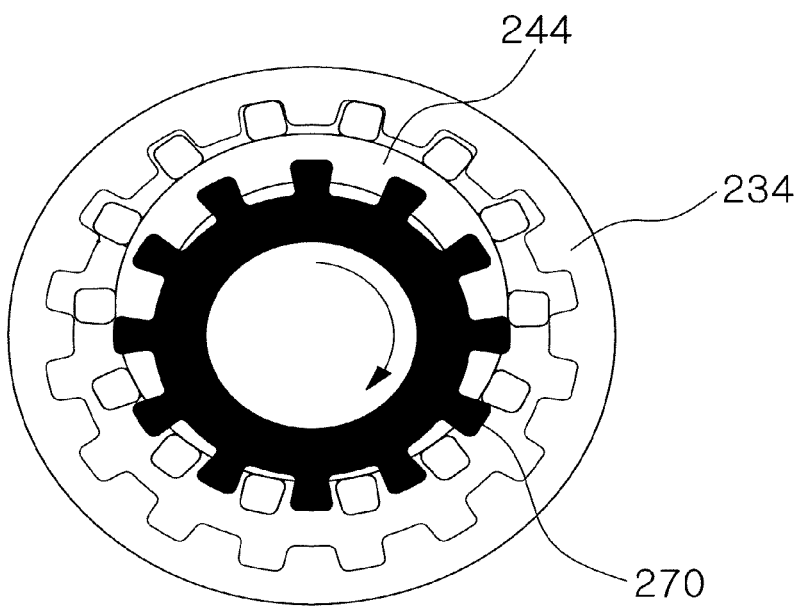
(b)

[FIG 6]
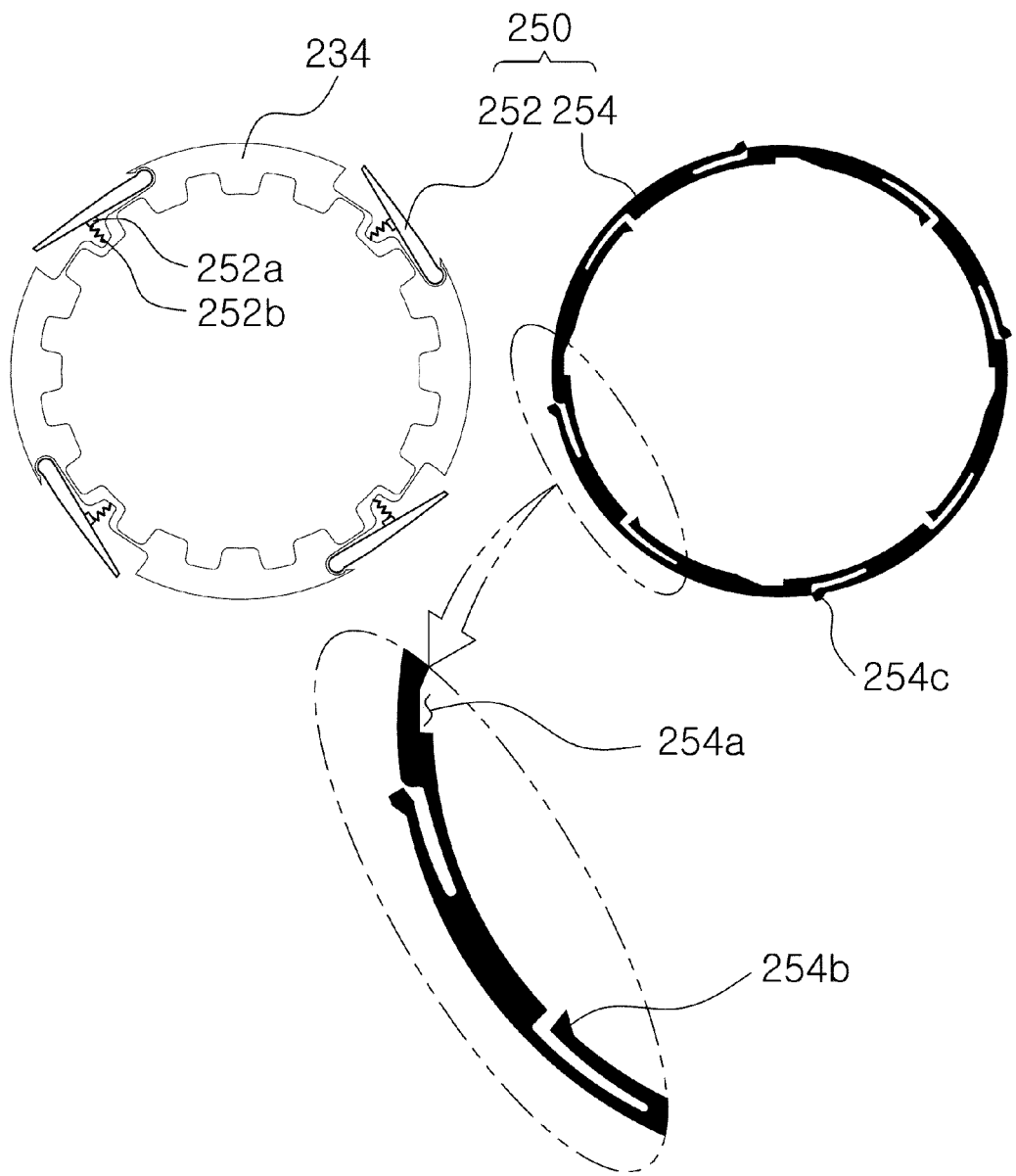

【FIG 7】
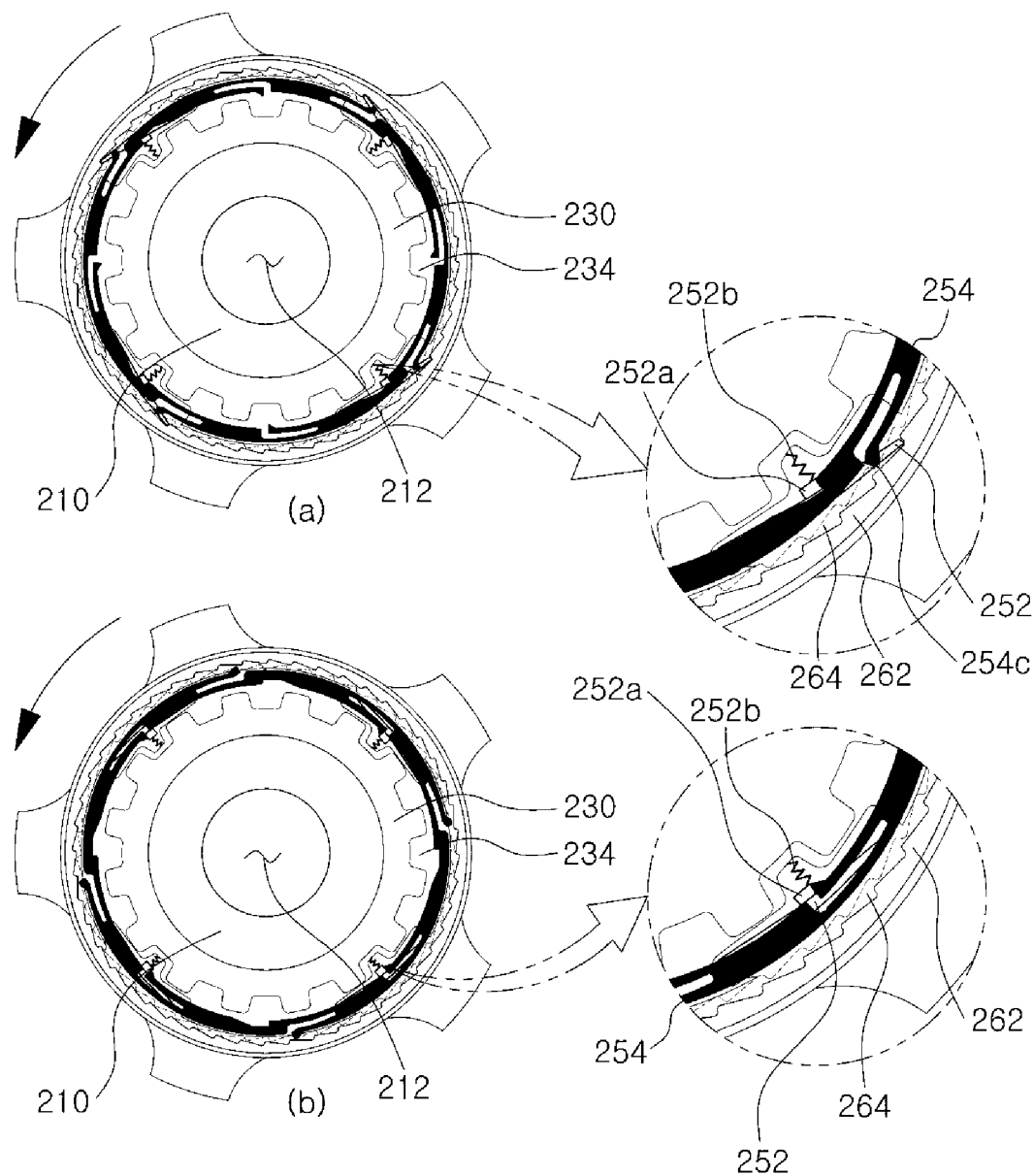

[FIG 8]
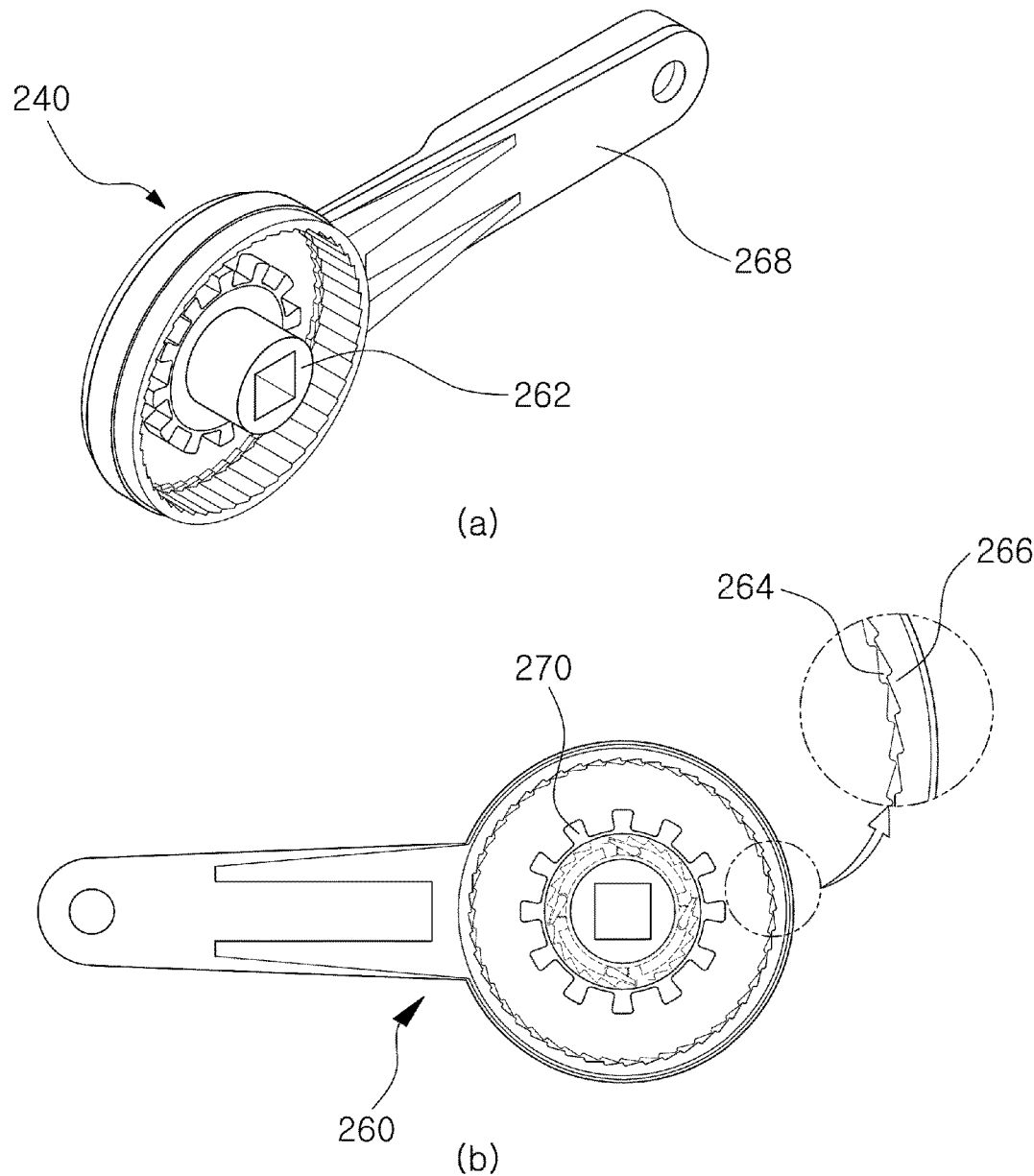

FIG 9
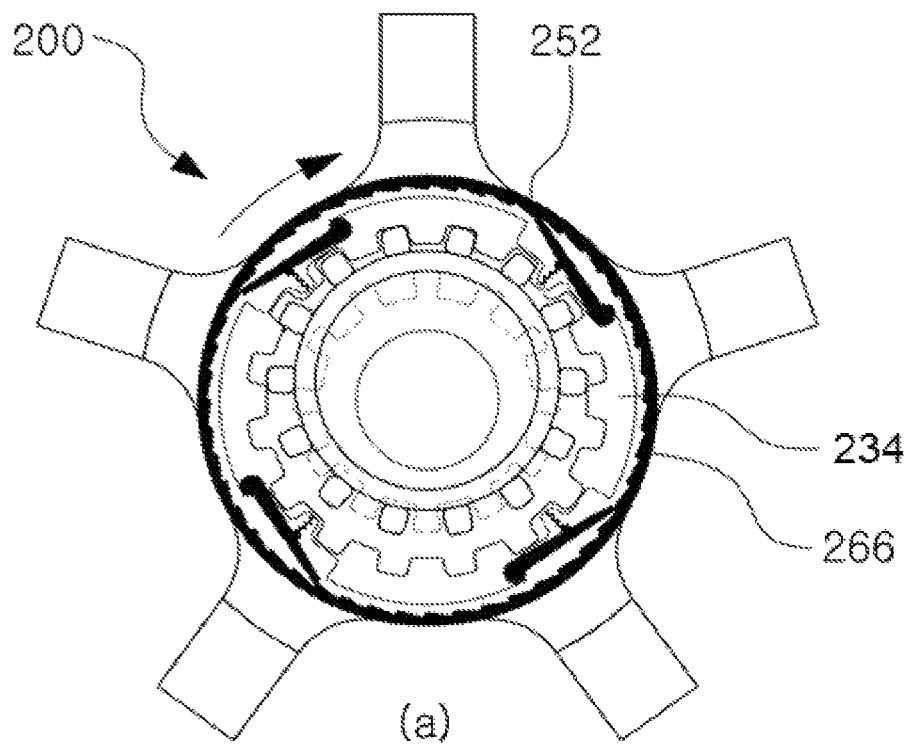
(a)
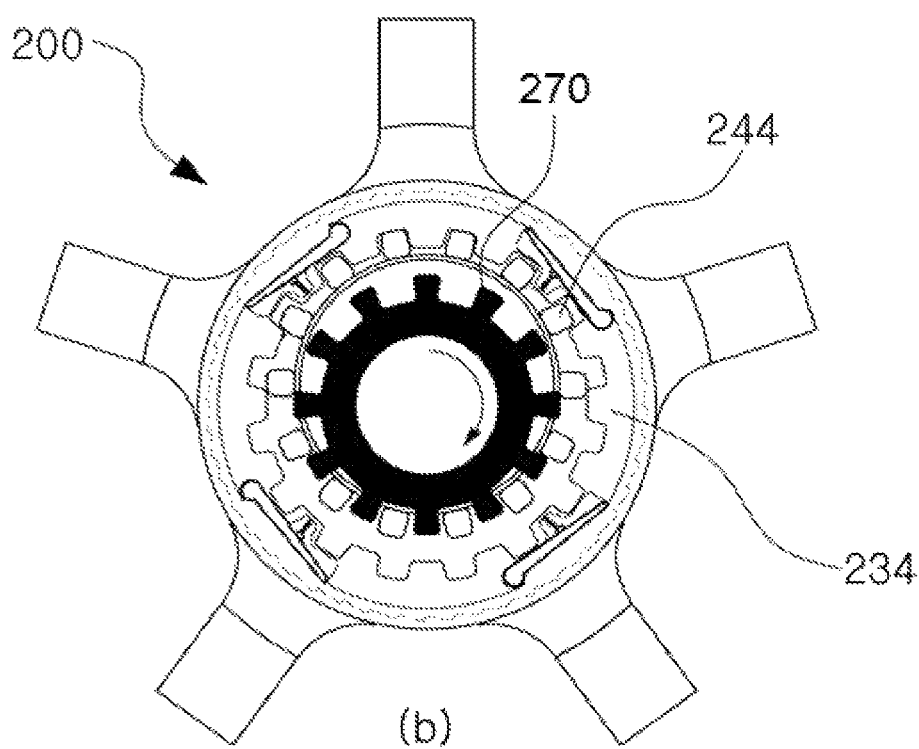
(b)

BICYCLE CRANK TRANSMISSION APPARATUS

CROSS REFERENCE TO PRIOR APPLICATIONS

This application is a National Stage Patent Application of PCT International Patent Application No. PCT/KR2016/015275 (filed on Dec. 26, 2016) under 35 U.S.C. § 371, which claims priority to Korean Patent Application No. 10-2016-0014885 (filed on Feb. 5, 2016), which are all hereby incorporated by reference in their entirety.

TECHNICAL FIELD

The present invention relates to a bicycle transmission apparatus. More specifically, it relates to a hub-gear transmission apparatus that is installed on the crankset of a bicycle.

BACKGROUND ART

Conventionally, a bicycle is provided with a transmission apparatus installed on the crankset and rear wheel axle to ensure efficient cycling.

FIG. 1 illustrates a conventional bicycle crank transmission apparatus.

Referring to this, the conventional bicycle crank transmission apparatus (100) includes multiple chainrings (110) of different sizes to be installed on the bottom bracket of the bicycle; a front derailleur (120) which, when coupled to the frame (F), moves the chain placed on a certain chainring (110) to another chainring (110); and a shift lever (140) which, coupled to the front derailleur (120) by wire (130) and mounted on the handlebar of the bicycle and which serves to manipulate the front derailleur (120).

However, a problem with the conventional bicycle crank transmission apparatus (100) is that it frequently falls off from the chainring (110) during a gear shift because of the shifting mechanism which forces the chain to be moved. To put the chain that fell off back on the chainring (110) is a difficult task for children a user. Furthermore, while the user is putting the chain back on, their hands or clothing can get contaminated by the lubricant applied to the chain.

Moreover, another limitation of the conventional bicycle crank transmission apparatus (100) is that it is difficult to be made smaller and lighter in weight because it has multiple chainrings (110) stacked in layers and is provided with the shift lever (140) separately as it is coupled to the front derailleur (120) by the wire (130).

DETAILED DESCRIPTION OF THE INVENTION

Technical Problem

It is therefore an object of the present invention to solve the above-described problem by providing an integrated bicycle crank transmission apparatus which can be made smaller and lighter by implementing a shifting mechanism using a single chainring through gear reduction, and which eliminates the problem of a chain falling off from the chainring during a gear shift.

Solution to Problem

In order to solve the aforementioned problem, according to an embodiment of the present invention, the invention provides a bicycle crank transmission apparatus comprising a hollow shaft member; a base plate which is coupled to the aforementioned shaft member on one side and installed securely on a bottom bracket featuring a spindle on the other side; a chainring housing which is coupled to the aforementioned shaft member in a way that allows its rotation and has a ring gear installed securely inside; a reduction gear unit arranged in the middle of the aforementioned ring gear; a directly-coupled ratchet unit installed on the aforementioned ring gear; a crank cover where a coupling shaft coupled to the aforementioned spindle is perpendicularly provided in the center and where clutch ratchet teeth, which are engaged with the aforementioned directly-coupled ratchet unit, and directly-coupled ratchet teeth are vertically stacked on the internal wall surface; and a sun gear installed on the aforementioned coupling shaft in such a way that it only rotates in clockwise direction and partially engaged with the aforementioned reduction gear unit.

The invention is characterized by providing the aforementioned base plate with a BB holder and also by conveniently coupling said BB holder to the aforementioned bottom bracket.

It is further characterized by providing an anti-reverse rotation unit between the aforementioned base plate and the aforementioned chainring housing so that the aforementioned chainring housing does not rotate in anti-clockwise direction around the aforementioned shaft member within limits of a predetermined rotational force.

The aforementioned anti-reverse rotation unit is made up of an internal ratchet gear formed on the aforementioned base plate, an external ratchet gear formed on the aforementioned chainring housing, and an anti-reverse rotation ring which has multiple elastic hooks both on the external and internal circumferences and is arranged between the aforementioned internal ratchet gear and the aforementioned external ratchet gear.

The aforementioned reduction gear unit consists of an eccentric guide installed securely on the aforementioned shaft member and arranged in the center of the aforementioned ring gear, and an eccentric gear which is provided in a way that allows it to rotate along the external circumference of the aforementioned eccentric guide, and a part of which is engaged with the aforementioned ring gear while another part of which is engaged with the aforementioned sun gear.

The aforementioned directly-coupled ratchet unit consists of multiple directly-coupled ratchets, which are installed at intervals on the external circumference of the aforementioned ring gear, extend in radial direction, and each have operating protrusions on one side; and a directly-coupled ratchet clutch which is stacked on one side of the aforementioned ring gear, and features indentations where the aforementioned operating protrusions are received in circumferential direction, and supports that support the aforementioned operating protrusions, which are alternately formed at intervals on the internal circumference, with multiple elastic ratchets provided at intervals on the external circumference.

Advantages of the Invention

An advantage of the present invention comprising the above-described components is to eliminate the need for multiple chainrings and an extra shift lever by realizing a shifting mechanism through the reduction gear unit and the directly-coupled ratchet unit provided inside, and to ultimately make the product smaller and lighter.

Another advantage of the invention is to prevent the chain from falling off from the chainring during a gear shift.

Yet another advantage of the invention is to allow fast and intuitive gear shifting by rotating the crank arm in anti-clockwise direction.

BRIEF DESCRIPTION OF THE DRAWINGS

FIG. 2 is a perspective view of a bicycle crank transmission apparatus according to one embodiment of the present invention.

FIG. 3a is an exploded perspective view of a bicycle crank transmission apparatus according to one embodiment of the present invention.

FIG. 3b is an exploded perspective view of FIG. 3a as viewed from a different angle.

FIG. 4 is a view showing an anti-reverse rotation unit provided between the base plate and chainring housing of the invention.

FIG. 5 is a view schematically showing the coupling relationship between the reduction gear unit and ring gear of the invention.

FIG. 6 is a view showing the structure of a directly-coupled ratchet unit of the invention.

FIG. 7 is a view schematically showing the working principle of the directly-coupled ratchet unit of the invention.

FIG. 8 is a view showing the structure of a crank cover of the invention.

FIG. 9 is a view schematically showing the shifting mechanism of a bicycle crank transmission apparatus according to one embodiment of the invention.

PREFERRED EMBODIMENT OF THE INVENTION

Figure 1:
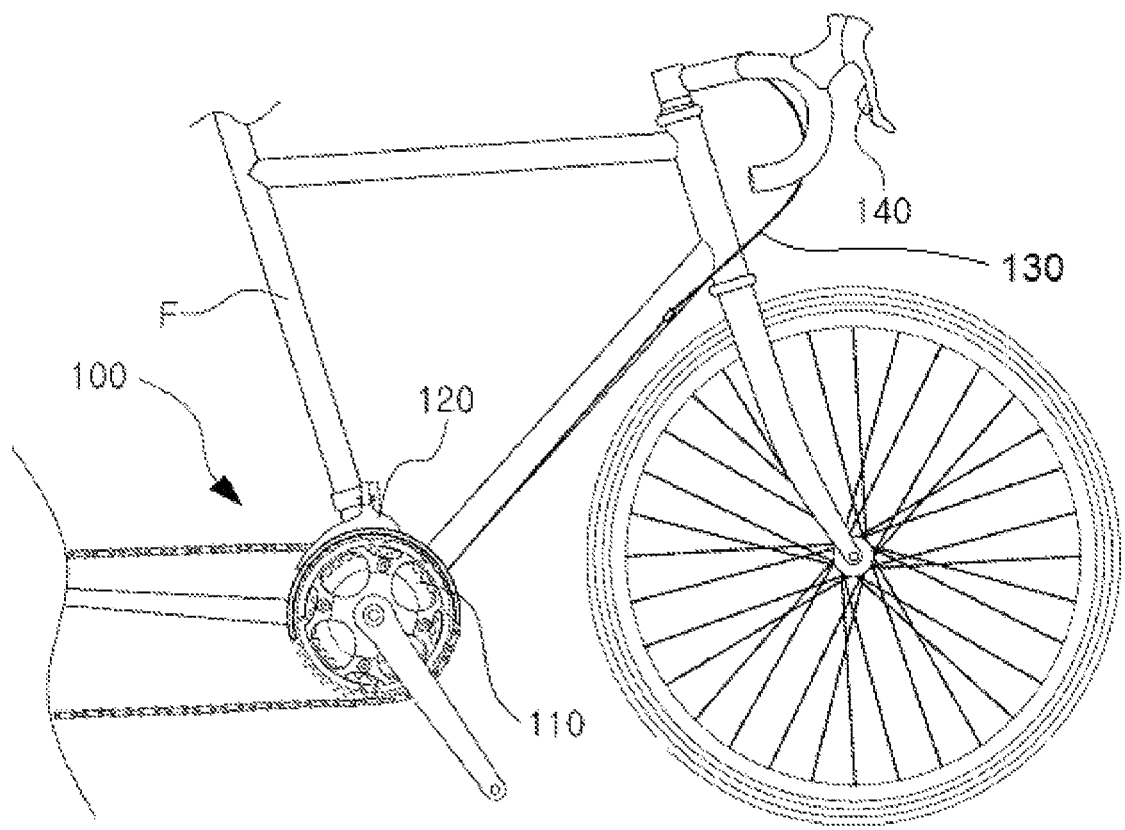
FIG. 1 is a view schematically showing the structure of a conventional bicycle crank transmission apparatus.

The present invention will now be described more fully hereinafter with reference to the accompanying drawings, in which a preferred embodiment of the invention is shown. Throughout this process, the relative thickness of lines or size of elements as illustrated in the drawings may be exaggerated for clarity and convenience. In addition, the terms used in the present invention have been selected in consideration of the functions of the present invention, but may be altered according to the intent of a user or an operator or conventional practice.

Referring to FIGS. 2 to 9, the bicycle crank transmission apparatus (200) according to one embodiment of the present invention comprises a shaft member (210), a base plate (220), a chainring housing (230), a reduction gear unit (240), a directly-coupled ratchet unit (250), a crank cover (260), and a sun gear (270).

The shaft member (210) is a disk shape with a predetermined thickness having a hollow (212). The shaft member (210) is securely coupled to the base plate (220) described below on one side and, on the other side, the eccentric guide (242) described below is securely installed.

In addition, the chainring housing (230) described below is coupled to the shaft member (210) in a way that allows rotation of said housing.

The base plate (220) is coupled to the shaft member (210) on one side and features in the center a hole (222) with the same diameter as that of the hollow (212) in the shaft member (210).

The center of said hole (222) preferably has the same axis as that of the hollow (212) formed in the shaft member (210).

On the other side, the base plate (220) is securely coupled to the bottom bracket (B) mounted on the bicycle frame (F).

Furthermore, the base plate (220) preferably has a removable bottom bracket (BB) holder (224) on the other side. The BB holder (224) has a shape that corresponds to the end of the bottom bracket (B) in order to install the present invention on various bottom brackets (B) with different sizes depending on the manufacturer.

The chainring housing (230) is coupled to the shaft member (210) in a way that allows rotation of the housing. On one side, an internal ring gear (234) is securely installed on the chainring housing (230), and multiple chainring coupling portions (232) coupled to the chainring (C) are formed at intervals in circumferential direction on the external circumference.

Furthermore, as described earlier, the chainring housing (230) is made separable from the chainring (C) but the chainring housing (230) may be integrated with the chainring (C) according to the intent of a user.

An anti-reverse rotation unit (280) is provided between the base plate (220) and the chainring housing (230).

Such an anti-reverse rotation unit (280) allows the chainring housing (230) to freely rotate in clockwise direction with the shaft member (210) as a reference axis while preventing it from rotating in anti-clockwise direction within limits of a predetermined rotational force.

Referring to FIG. 4, the anti-reverse rotation unit (280) consists of an internal ratchet gear (282), an external ratchet gear (284), and an anti-reverse rotation ring (286).

The internal ratchet gear (282) is stacked on the edge of the base plate (220) while the external ratchet gear (284) is stacked on the center of the chainring housing (230).

The teeth formed on the internal ratchet gear (282) and the external ratchet gear (284) consist of primary sliding portions (282a, 284a) and secondary sliding portions (282b, 284b). Unlike conventional ratchets, those primary sliding portions (282a, 284a) that constitute pitch surfaces form an acute angle with a pitch circle.

The anti-reverse rotation ring (286) is arranged between the internal ratchet gear (282) and the external ratchet gear (284) and multiple elastic hooks (286a) are provided at intervals in circumferential direction on the external and internal circumferences.

Based on the front view of this invention (FIG. 4 was prepared based on the rear view of the invention), the working principle of the anti-reverse rotation unit (280) will be briefly described.

When the user rotates the crank cover (260) in anti-clockwise direction to shift gears, the crank cover (260) and the chainring housing (230) will not directly engage, but since they are close enough, a weak force will be transmitted to the chainring housing (230) during rotation.

In this case, as the elastic hooks (286a) of the anti-reverse rotation ring (286) engage with the primary sliding portions (282a, 284a) of the internal ratchet gear (282) and the external ratchet gear (284), blocking rotation of the chainring housing (230).

When the user reverses the bicycle, the rear wheel of the bicycle will start rotating, transmitting a strong force to the chainring housing (230) through the chain.

Then, the elastic hooks (286a) of the anti-reverse rotation ring (286) engaged with the primary sliding portions (282a, 284a) of the internal ratchet gear (282) and the external ratchet gear (284) are internally pressurized by the strong force of rotation, being forced to ride over the primary sliding portions (282a, 284a).

In conclusion, the anti-reverse rotation unit (280) ensures the shifting mechanism is smoothly implemented by preventing the chainring housing (230) from rotating in anti-clockwise direction from the shaft member (210) during a gear shift, but causes the chainring housing (230) to rotate in anti-clockwise direction when the bicycle reverses, preventing damage to the bicycle.

The reduction gear unit (240) consists of the eccentric guide (242) and the eccentric gear (244).

The eccentric guide (242) has a cylindrical shape and features an eccentric hole (242a) with a certain distance from the center. The eccentric guide (242) is securely installed on the other side of the shaft member (210) and then arranged in the center of the ring gear (234). The hollow (212) shares the same center as the eccentric hole (242a).

The eccentric gear (244) is provided in a way that allows it to rotate along the external circumference of the eccentric guide (242). A certain portion of the eccentric gear (244) is engaged with the ring gear (234) and another portion opposite said portion is engaged with the sun gear (270) described below.

FIG. 5 is a view illustrating the coupling relationship between the reduction gear unit (240) and the ring gear (234). Referring to FIG. 5, the reduction gear unit (240) receives the force of rotation of the crank cover (260) from the sun gear (270) and then rotates the ring gear (234) with the reduced number of revolutions per minute.

Unlike conventional planetary gears (not shown), the reduction gear unit (240) rotates in the same direction as the sun gear (270), transmitting the reduced force of rotation to the ring gear (234). It significantly lowers the risk of wear or damage to the reduction gear unit (240) relative to planetary gears (not shown). Furthermore, it increases the durability of the apparatus since it does not cause any force of rotation in reverse direction that may unnecessarily apply to the chainring housing (230), etc.

The directly-coupled ratchet unit (250) consists of multiple directly-coupled ratchets (252) and a directly-coupled ratchet clutch (254).

More specifically, the directly-coupled ratchets (252) are installed on the external circumference of the ring gear (234) and extend in radial direction by means of mechanical elements with elasticity such as springs (252b). The extending directly-coupled ratchets (252) are engaged with the directly-ratchet teeth (266) as the crank cover (260) rotates in clockwise direction. The directly-coupled ratchets (252) have operating protrusions (252a) on one side.

The directly-coupled ratchet clutch (254) is installed on one side of the ring gear (234). On the internal circumference of the directly-coupled ratchet clutch (254) are provided alternately the indentations (254a), where aforementioned operating protrusions (252a) are received in circumferential direction, and supports (254b), which support the aforementioned operating protrusions (252a). On the outer circumference, multiple elastic ratchets (254c) are provided at intervals in circumferential direction. The multiple elastic ratchets (254c) are engaged with the clutch ratchet teeth (264) as the crank cover (260) rotates in anti-clockwise direction.

The crank cover (260) is made in the shape of a drinking cup lid. In the center, a coupling shaft (262) is provided perpendicularly, which is coupled to the spindle (BS) of the bottom bracket (B). On the internal wall surface, the clutch ratchet teeth (264) engaged with the directly-coupled ratchet unit (250) and the directly-coupled ratchet teeth (266) are stacked vertically.

The clutch ratchet teeth (264) and the directly-coupled ratchet teeth (266) operate in opposite directions. In a pre-determined location on the outer circumference of the crank cover (260) is formed a crank arm (268).

The crank cover (260) is mounted on one side of the chainring housing (230). At the same time, the coupling shaft (262) is coupled to the spindle (BS) after passing through the hollow (212) of the shaft member (210).

The sun gear (270) is installed in such a way that it only rotates in clockwise direction on the coupling shaft (262) of the crank cover (260). To that end, preferably, a ratchet unit is provided in one direction inside the sun gear (270). As described earlier, the sun gear (270) is partially engaged with the reduction gear unit (240).

The shifting mechanism of the present invention comprising the above-described components will be described with reference to FIGS. 7 to 9.

First, referring to FIG. 7, a view showing the working principle of the directly-coupled ratchet unit (250), when the crank cover (260) rotates in anti-clockwise direction, the clutch ratchet teeth (264) get engaged with the elastic ratchet (254c), and then the crank cover causes the directly-coupled ratchet clutch (254) to rotate in anti-clockwise direction.

Reverse rotation of the chainring housing (230) gets blocked by the anti-reverse rotation unit (280). This causes the directly-coupled ratchet clutch (254) to slide against and rotate around the fixed ring gear (234).

Every time the directly-coupled ratchet clutch (254) rotates at a predetermined angle, the operating protrusions (252a) abutting the internal circumference of the directly-coupled ratchet clutch (254) become received in the indentations (254a) or supported by the supports (254b), causing the directly-coupled ratchet to extend or fold.

More specifically, when the operating protrusions (252a) are received in the indentations (254a), the directly-coupled ratchets (252) extend outside the ring gear (234) by means of elastic mechanical elements, and the extending directly-coupled ratchets (252) get engaged with the directly-coupled ratchet teeth (266). In this case, the ring gear (234) may get directly coupled to the crank cover (260) and start rotating at the same revolutions per minute.

When the operating protrusions (254b) are supported by the supports (254b), the directly-coupled ratchets (252) fold up under pressure, getting disengaged from the directly-coupled ratchet teeth (266). Then, the ring gear (234) may rotate at a lower RPM than the crank cover (260) as it becomes coupled to the sun gear (270) through the reduction gear unit (240).

To describe the shifting mechanism of the invention in a high gear with reference to (a) of FIG. 9, if the crank cover (260) is rotated in clockwise direction after the directly-coupled ratchets (252) have extended from the ring gear (234), the directly-coupled ratchet teeth (266) become engaged with the directly-coupled ratchets (252), while the crank cover (260) directly causes the ring gear (234) to rotate at the same RPM.

Then, the sun gear (270) receives the force of rotation of the ring gear (234) through the reduction gear unit (240) and idles at a higher RPM than the crank cover (260).

To describe the shifting mechanism of the invention in a low gear with reference to (b) of FIG. 9, if the crank cover (260) is rotated in clockwise direction after the directly-coupled ratchets (252) have folded on the ring gear (234), the sun gear (270) becomes engaged with the reduction gear unit (240) while the crank cover (260) directly causes the ring gear (234) to rotate at a reduced RPM.

To sum up, the present invention can directly cause the ring gear (234) to rotate at the same RPM as the crank cover (260), or cause the ring gear (234) to rotate at a reduced RPM through the sun gear (270) and reduction gear unit (240) by rotating the crank cover (260) in anti-clockwise direction and then manipulating the directly-coupled ratchet unit (250).

The present invention eliminates the need for multiple chainrings and a separate shift level and can thus make products smaller and lighter by realizing the shifting mechanism using the reduction gear unit and directly coupled unit. That is why it has an advantage that it can make products smaller and lighter. Another advantage of the invention is to prevent the chain from falling off from the chainring during a gear shift. Lastly, an advantage of the invention is to allow fast and intuitive gear shifting.

One embodiment of the present invention has been described with reference to the attached drawings, but those skilled in the art will recognize that other variations and modifications can be made to the above-described technology of the invention without departing from the spirit or essential features of the invention.

The invention claimed is:

1. A bicycle crank transmission apparatus comprising:
a hollow shaft member;
a base plate having a first side securely coupled to the shaft member and a second side, opposite to the first side, installed securely on a bottom bracket equipped with a spindle;
a chainring housing which is rotatably coupled to the shaft member and has a ring gear securely fixed to the chainring housing inside the chainring housing;
a reduction gear unit arranged in a center of the ring gear, including:
an eccentric guide arranged in the center of the ring gear, securely installed on the shaft member, and having an eccentric hole which has an eccentric center; and
an eccentric gear provided to rotate along an external circumference of the eccentric guide and having eccentric gear teeth each including a first part protruded from an outer circumference of the eccentric gear in a radial direction of the eccentric gear and a second part protruded from the first part in a direction parallel to a centric axis of the eccentric gear,
wherein the eccentric gear includes a first portion spaced apart from the eccentric center with a first distance, and a second portion opposite to each other and spaced apart from the eccentric center with a second distance longer than the first distance, and
wherein the external circumference of the eccentric guide engages with an internal circumference of the first portion of the eccentric gear, and the first part of the eccentric gear teeth formed at the second portion of the eccentric gear engages with ring gear teeth formed at an internal circumference of the ring gear;
a directly-coupled ratchet unit installed on the ring gear, including:
multiple directly-coupled ratchets, which are installed at intervals on an external circumference of the ring gear and expand in a radial direction of the ring gear, and each having operating protrusions on one side, and
a directly-coupled ratchet clutch in a circular ring shape in which the multiple directly-coupled ratchets are surrounded, which is located on one side of the ring gear, and having indentations configured to receive the operating protrusions, supports configured to support the operating protrusions, and multiple elastic ratchets provided at intervals on an external circumference of the ratchet clutch, wherein the indentations and the supports are alternately formed at intervals on an internal circumference of the ratchet clutch;
a crank cover including:
a coupling shaft formed at a center of the crank cover and coupled to the spindle;
clutch ratchet teeth formed on an internal wall surface of the crank cover and engaged with the elastic ratchets of the directly-coupled ratchet clutch; and
directly-coupled ratchet teeth formed on the internal wall surface of the crank cover and engaged with the directly-coupled ratchets expanded in the radial direction of the ring gear, wherein the clutch ratchet teeth and the directly-coupled ratchet teeth are arranged next to each other along a circumferential direction of the internal wall surface of the crank cover; and
a sun gear which is installed on the coupling shaft of the crank cover in such a way that the sun gear only rotates in a first circumferential direction and the sun gear is partially engaged with the second part of the eccentric gear teeth formed at the first portion of the eccentric gear.

2. The bicycle crank transmission apparatus of claim 1, wherein the base plate includes a removable bottom bracket (BB) holder and the BB holder couples the base plate to the bottom bracket.

3. The bicycle crank transmission apparatus of claim 1, wherein an anti-reverse rotation unit is provided between the base plate and the chainring housing, and the chainring housing does not rotate in a second circumferential direction opposite to the first circumferential direction around the shaft member when within limits of a predetermined rotational force.

4. The bicycle crank transmission apparatus of claim 3, wherein the anti-reverse rotation unit comprises:
an internal ratchet gear formed on the base plate;
an external ratchet gear formed on the chainring housing; and
an anti-reverse rotation ring arranged between the internal ratchet gear and the aforementioned external ratchet gear, and including elastic hooks provided on internal and external circumferences of the anti-reverse rotation ring to engage with the internal ratchet gear and the external ratchet gear, respectively.

5. The bicycle crank transmission apparatus of claim 1, wherein the reduction gear unit and the sun gear rotate in a same direction.

* * * * *